United States Patent [19]
Ziegler

[11] Patent Number: 6,016,854
[45] Date of Patent: Jan. 25, 2000

[54] WOODWORKING APPARATUS FOR MAKING CURVED COMPONENTS

[76] Inventor: Edward James Ziegler, 3817 Stonewall Rd., Jackson, Mich. 49203

[21] Appl. No.: 09/184,185

[22] Filed: Nov. 2, 1998

[51] Int. Cl.[7] ............................................. B27C 5/00
[52] U.S. Cl. .................. 144/135.2; 144/48.6; 144/48.7; 144/134.1; 144/137; 144/135.3; 144/154; 144/356; 144/371
[58] Field of Search ........................ 144/1.1, 2.1, 48.6, 144/48.7, 134.1, 135.2, 137, 145.2, 356, 357, 363, 371, 135.3

[56] References Cited

U.S. PATENT DOCUMENTS

| | | | |
|---|---|---|---|
| 107,135 | 9/1870 | Watkins . | |
| 4,155,383 | 5/1979 | Welliver | 144/154.5 |
| 4,986,152 | 1/1991 | Sammons | 144/137 |
| 5,562,135 | 10/1996 | Beth et al. . | |

*Primary Examiner*—W. Donald Bray
*Attorney, Agent, or Firm*—Harness, Dickey & Pierce, P.L.C.

[57] ABSTRACT

A woodworking apparatus with a base for retaining a work piece and a bridge for mounting a tool. The bridge is pivotally mounted to the base by two arms and is adjustable towards the top, side and bottom faces of the work piece. Since the bridge, and hence the tool, is adjustable within a wide range of different angles, the need for multiple bit pieces is greatly reduced. The woodworking apparatus further includes a pivot pin, attachable to the base and to the work piece, for pivoting the work piece along an arcuate path with a predetermined radius measured from the pivot pin to the tool. The pivot pin is movable along a guide within the base, allowing a rough adjustment in the radius of the arcuate path. Further, the guide itself is movable along the base, allowing a fine adjustment in the radius. Because of this fine adjustment of the radius, the time-consumption and imprecision inherent in the conventional techniques in the art of creating a curved work piece with a constant radius or with multiple cuts along the same piece has been greatly reduced.

17 Claims, 5 Drawing Sheets

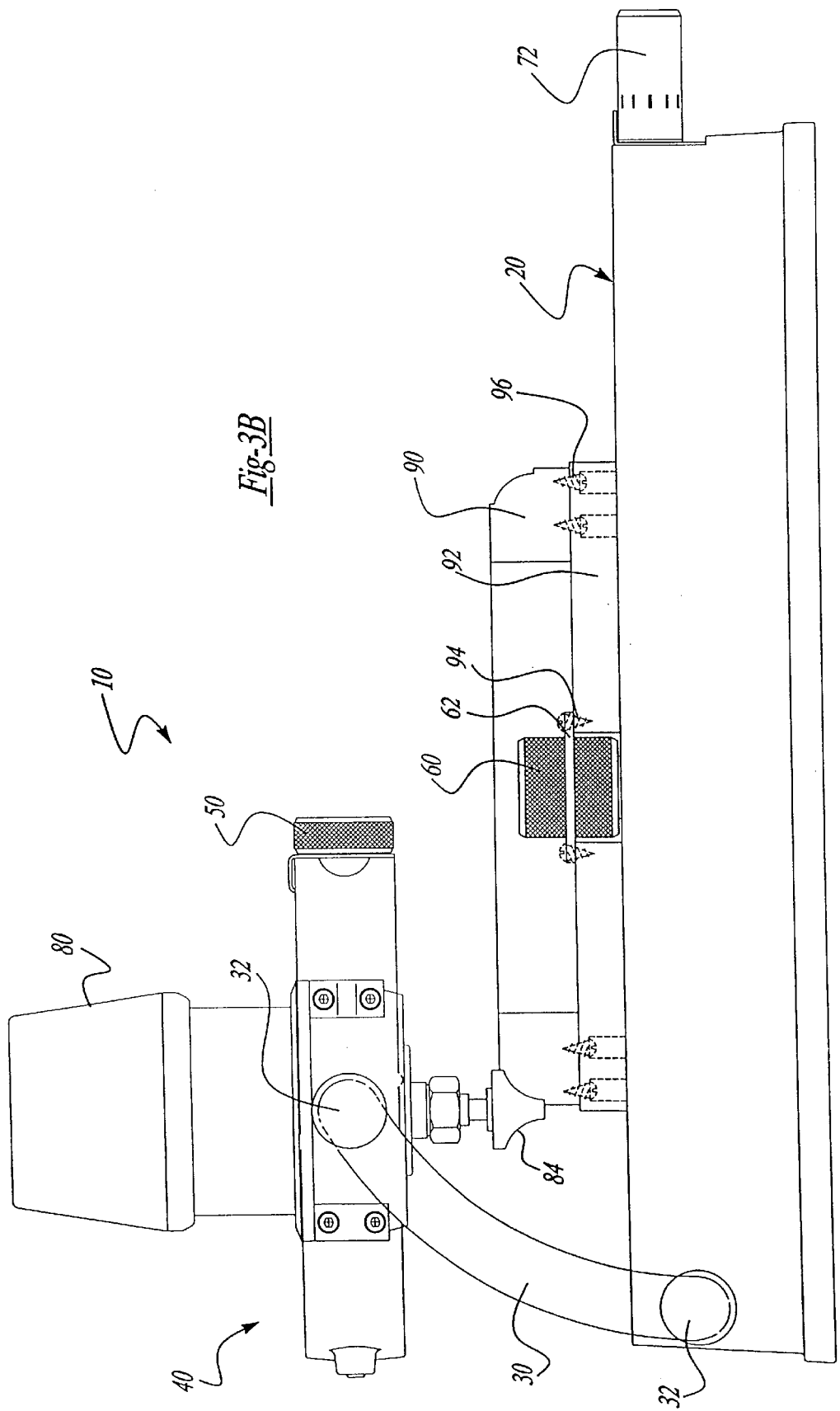

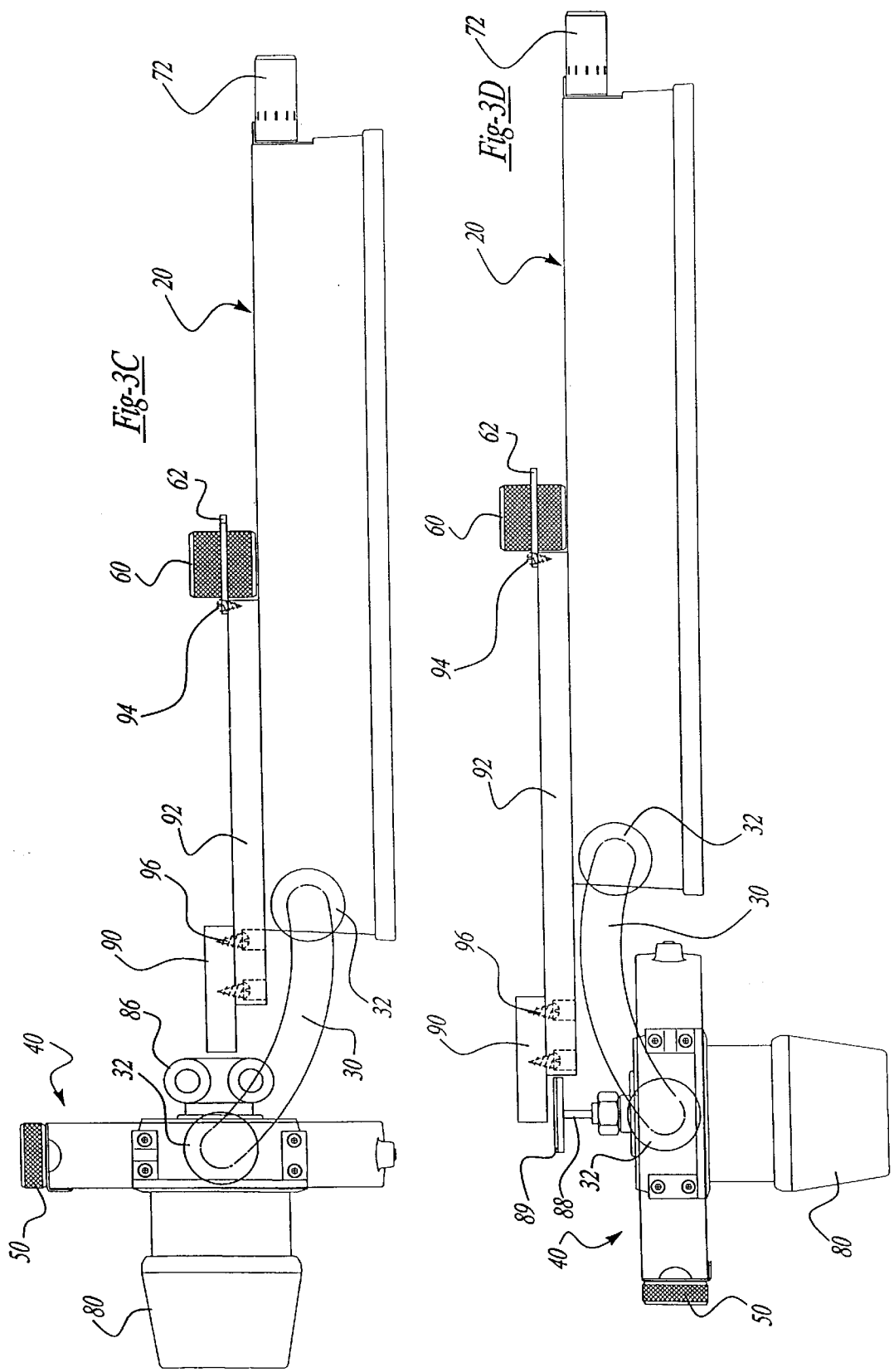

WOODWORKING APPARATUS FOR MAKING CURVED COMPONENTS

TECHNICAL FIELD OF THE INVENTION

This invention generally relates to woodworking apparatuses that cut work pieces into curved forms. More specifically, this invention relates to woodworking apparatuses that cut work pieces into curved forms by pivoting the work pieces about a movable axis.

BACKGROUND

As the craftsmanship of mass-produced furniture declines and the price of antique furniture rises, many would-be purchasers of fine furniture are starting the hobby of building their own. The hobby of woodworking, like most hobbies, requires many tools. Some of these tools, like the hammer and saw, are generally found in a typical toolbox, while others, like the table router, are exclusively bought and used by woodworkers.

The conventional table router is used to cut decorative edges and grooves into work pieces by providing a table surface to support a work piece and a router bit to cut the work piece. The router bit, either protruding up from a hole in the table or down from an arm above the table, cuts a specific shape upon contact with the work piece. There are currently hundreds of different shapes of router bits on the market, each cutting a slightly different shape.

Since the router bit is mounted in a fixed position in the conventional table router relative to the work piece, each router bit can only cut one specific shape in the work piece. Further, since woodworkers do not generally desire to be limited to a certain shape, they are inclined to buy dozens of shapes to meet their needs, resulting in significant expenditure of money and storage space.

In addition to cutting straight edges and grooves, the conventional table router can also be used to cut curved edges and grooves into work pieces. This process is typically accomplished by moving the work piece in an arcuate path guided by a template. A significant difficulty arises, however, when a woodworker wishes to create a curved work piece with a constant radius, or with multiple cuts along the same piece, like one could imagine in a curved crown molding. In these situations, the quality of the curved cuts is dependent on the precision of the template and the skill of the artisan.

Although curved cuts can be made by a skilled artisan with time and patience, a lesser skilled artisan would find the task extremely difficult. Thus, because of the need for multiple bit pieces and their inherent limitations with curved work pieces, the conventional table routers in the art can be expensive, time-consuming, and imprecise.

SUMMARY OF THE INVENTION

Accordingly, this invention provides for a woodworking apparatus that overcomes the problems and disadvantages of the conventional techniques in the art. Additionally, the present invention provides for a woodworking apparatus that adjusts a tool within a wide range of different angles for a reduction of bit pieces. Further, the present invention also provides a woodworking apparatus that creates a curved work piece with a constant radius or with multiple cuts along the same piece, and reduces the time consumption and imprecision inherent in the conventional techniques in the art.

Briefly, the present invention includes a woodworking apparatus with a base for retaining a work piece and a bridge for mounting a tool. The bridge is pivotally mounted to the base by two arms and is adjustable towards the top, side and bottom faces of the work piece. Since the bridge, and hence the tool, is adjustable within a wide range of different angles, the need for multiple bit pieces is greatly reduced.

The woodworking apparatus further includes a pivot pin, attachable to the base and to the work piece, for pivoting the work piece along an arcuate path with a predetermined radius measured from the pivot pin to the tool. The pivot pin is movable along a guide within the base, allowing a rough adjustment in the radius of the arcuate path. Further, the guide itself is movable along the base, allowing a fine adjustment in the radius. Because of this "fine-tuning" of the radius, the time-consumption and imprecision inherent in the conventional techniques in the art of creating a curved work piece with a constant radius or with multiple cuts along the same piece is reduced.

Further features and advantages of the invention will become apparent from the following discussion and accompanying drawings.

BRIEF DESCRIPTION OF THE DRAWINGS

FIG. 3B is a plan view of the present invention with a shaper bit pointed towards the top and side faces of the work piece;

FIG. 3C is a plan view of the present invention with a belt sander pointed towards the side face of the work piece; and FIG. 3D is a plan view of the present invention with a disc sander pointed towards the bottom face of the work piece.

DETAILED DESCRIPTION OF THE PREFERRED EMBODIMENT

Figure 1:
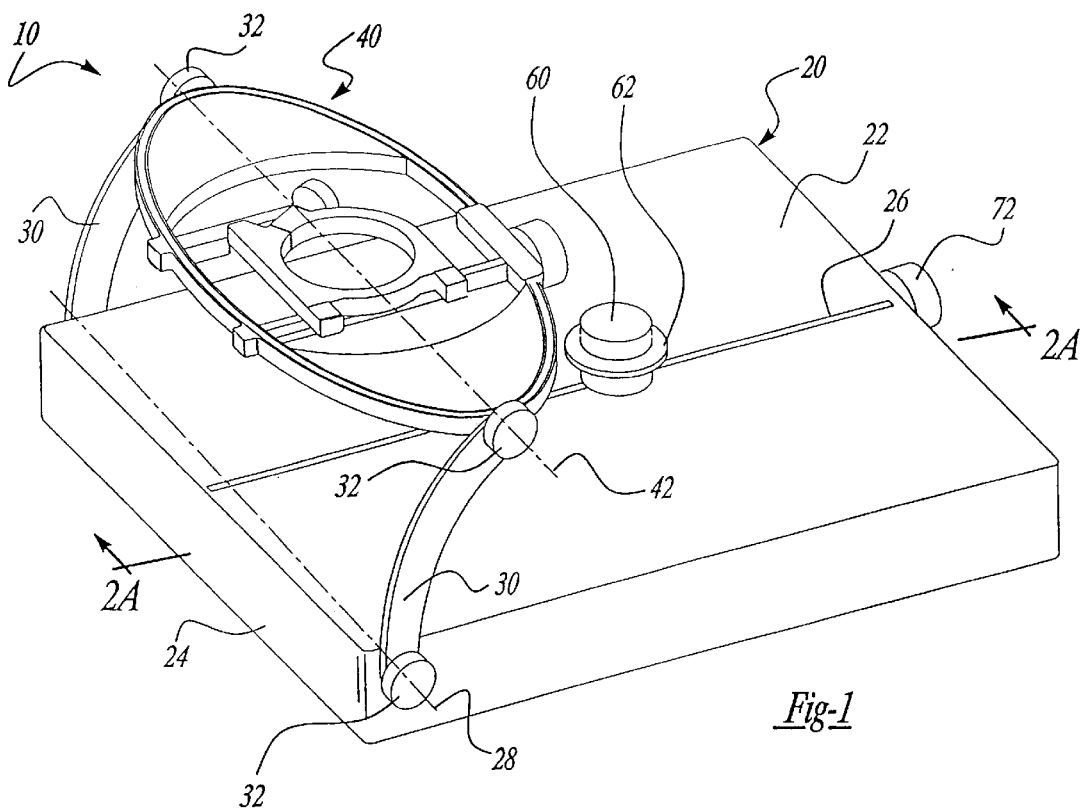
FIG. 1 is a perspective view of the present invention.

The following description of the preferred embodiment is merely exemplary in nature, and is in no way intended to limit the invention, or its application or uses.

The woodworking apparatus 10 of the present invention includes a base 20, two arms 30, a bridge 40, a pivot pin 60, a guide 70, and a tool 80.

As shown in FIG. 1, the base 20 includes a flat surface 22 for retaining a work piece. The surface 22, which is supported by side members 24, defines a slot 26 for horizontal travel of the pivot pin 60, as discussed below. In an alternative embodiment (not shown), the surface 22 could be made of two separate surfaces mounted on the side members 24 at a distance from each other. In this alternative arrangement, the distance between the surfaces would define the slot 26 for the pivot pin 60. In the preferred embodiment, the surface 22 is made of a high strength material, such as steel or aluminum that will not bend or buckle with extended use.

At one end, the base 20 defines a pivot axis 28 for the arms 30. The two arms 30 are pivotally attached to the base 20 along the pivot axis 28, and share a rotational axis with the pivot axis 28. The bridge 40, like the base 20, also defines a pivot axis 42 for the arms 30. The arms 30 are attached to the bridge 40 at the pivot axis 42, and also share a rotational axis with the pivot axis 42. In this preferred arrangement, the two arms 30 can position the bridge 40, and the tool 80, towards the top, side and bottom faces of the work piece, effectively reducing the need for bit pieces. The arms 30 include a securing knob 32 with a loose position and tight position, as shown at each of the attachment points in FIGS. 1 and 2B. The four securing knobs 32 allow free rotation of the arms 30 in their loose position, yet provide structural rigidity in their tight position.

Figure 2A:
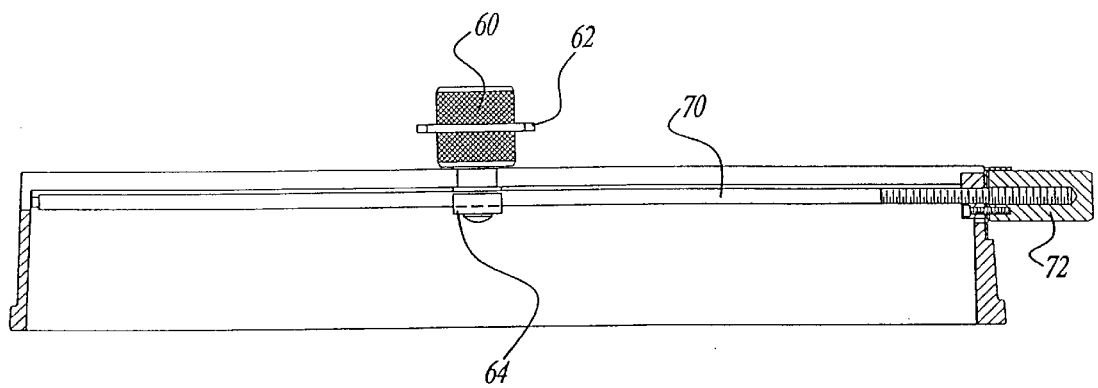
FIG. 2A is a plan view of the pin mechanism of the present invention.
Figure 2B:
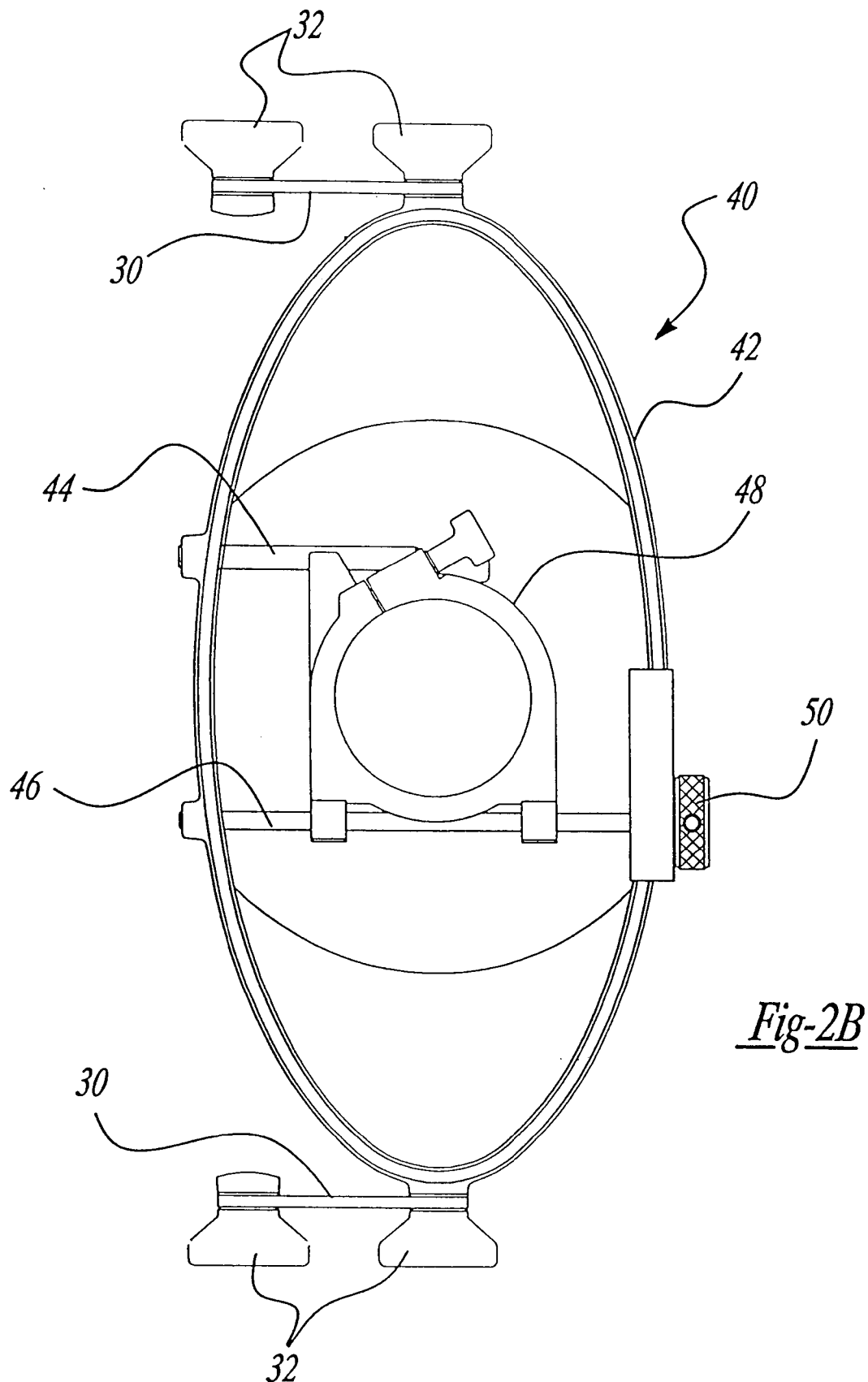
FIG. 2B is a top view of the bridge portion of the present invention.

As shown in FIG. 2B, the bridge 40, which mounts the tool 80, includes a shoulder 42, a support rod 44, a threaded rod 46, and a clamp 48. The clamp 48 has an inner diameter equal to the general outer diameter of the tools in the art, providing a snug fit for a router or shaper tool. The clamp 48 is slid over the support rod 44 on one side, and threaded onto the threaded rod 46 on the other side. These two rods 44 and 46 support the clamp 48 and the tool 80.

The support rod 44 is mounted on one side of the shoulder 42 and extends toward the other side. In an alternative embodiment, the support rod 44 is also mounted to the other side. The threaded rod 46 is mounted on one side of the shoulder 42, extends through the other side of the shoulder 42, and is supported by the shoulder 42 for rotational movement. On the other side of the shoulder 42, the threaded rod 46 forms an adjustment knob 50. The clamp 48, and hence the tool 80, is movable along the rods 44 and 46 within the shoulder 42 by turning the threaded rod 46 with the adjustment knob 50. In the preferred embodiment, the clamp 48 moves 0.0625 inches relative to the bridge 40 upon one full rotation of the adjustment knob 50.

As alluded to above and as shown in FIG. 2A, the surface 22 of the base 20 supports a pivot pin 60. The pivot pin 60 has an attachment plate 62 with several screw holes to receive screws and to secure a work piece, as shown in FIGS. 3A–D. The attachment plate 62 fits snuggly around the pivot pin 60, and shares a rotational axis with the pivot pin 60. The attachment plate 62, however, may be slid up and down the pivot pin 62 to accommodate thicker or thinner work pieces. After attaching to a work piece, the attachment plate 62 can pivot the work piece about the pivot pin 60 and along an arcuate path. The radius of the arcuate path, as measured from the pivot pin 60 along a horizontal plane to the contact point of the tool 80, is held constant through this motion, thereby increasing the precision of the woodworking apparatus 10. In addition to extending above the surface 22, the pivot pin 60 extends down the slot 26 and forms a clamp 64. This clamp 64 attaches the pivot pin 60 to the guide 70.

Working in conjunction, the attachment plate 62 and the pivot pin 60 provide a pivot means securable to the work piece for pivoting the work piece along an arcuate path. There are, however, several possible arrangements that may provide this pivot means, and the present invention is not intended to be limited to the preferred embodiment. Other such arrangements include, for example, drilling a hole directly into the work piece with a diameter about the same as the pivot pin and placing the work piece over the pivot pin. This arrangement would eliminate the need for the attachment plate 62.

The guide 70 extends under the surface 22 along the slot 26 from one end of the base 20 to the other end, generally perpendicular to the pivot axis 28 of the base 20. The guide 70 includes a smooth portion that is secured to the clamp 64 and a threaded portion that is received by an internally threaded adjustment knob 72. The knob 72 is preferably secured to the side member 24 for rotational movement, unlike the adjustment knob 50. Secured against rotation movement by the clamp 64, the guide 70 is poised for linear movement along its own axis by the adjustment knob 72. Since the pivot pin 60 is attached to the guide 70 by the clamp 64, turning the adjustment knob 72 moves the pivot pin 60, and hence fine-tunes the radius of the arcuate path. In the preferred embodiment, the pivot pin 60 moves 0.625 inches relative to the base 20 upon one full rotation of the adjustment knob 72.

Although the adjustment knob 72 allows for fine-tuning of the radius, there are times, especially when switching to a different work piece, when the radius must be adjusted several inches. Instead of turning the adjustment knob 72 through several rotations, the pivot pin 60 may be detached from the guide 70, moved toward the new position, and secured to the guide 70. At this position, turning the adjustment knob 72 may again fine-tune the radius of the arcuate path.

As described above, the guide 70 and the adjustment knob 72 provide an adjustment means mounted to the base 20 and secured to the pivot pin 60 for adjusting the radius of the arcuate path. There are, however, several possible arrangements that may provide this adjustment means, and the present invention is not intended to be limited to the preferred embodiment. Other such arrangements include a guide threaded through a clamp (like the arrangement of the threaded rod 46 and the adjustment knob 50), a guide attached to a rack-and-pinion gear, or a guide attached to a mechanical lever.

In an alternative embodiment of the present invention, the guide 70 may also be attached to a motor and a controller. The controller could send a signal to the motor to rotate and, through contact with the external threads, move the guide 70. In this alternative embodiment, the need to detach the pivot pin 60 from the guide 70 to move the pivot pin several inches could be eliminated by the motor.

Figure 3A:
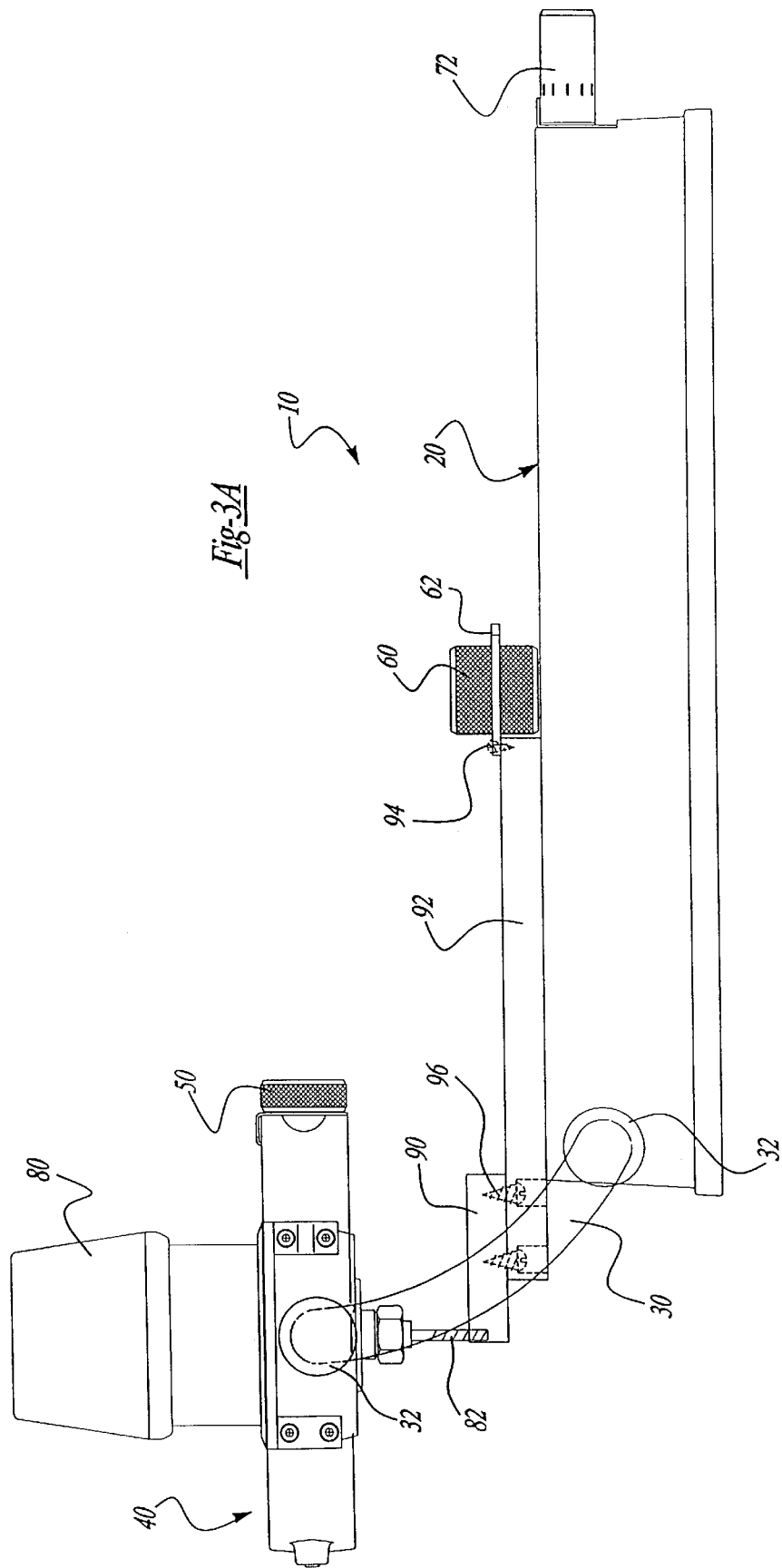
FIG. 3A is plan view of the present invention with a router bit pointed towards the top face of the work piece.

As shown in FIGS. 3A–D, the tool 80 may include a router bit 82, a shaper bit 84, a belt sander 86, and a disc attachment 88, each shown in FIGS. 3A, B, C, and D, respectively. The disc attachment 88 may further include a buffing material or sanding material at the contact surface 89. Because of the arrangement with the arms 30 and the adjustment knobs 32, each of the tools 80 may be positioned towards the top surface, the side surface, and the bottom surface of the work piece 90 without removing the work piece 90 from the surface 22. Although well adapted to accept router bits, shaper bits, belt sanders, and disc attachments, the present invention is not intended to be limited to such tools. Other tools, such as a drill with a drill bit, may be used.

Before operation of the woodworking apparatus 10, a work piece 90 is placed on the surface 22 and attached by several screws 96 to a scrap piece 92. The scrap piece 92, which is used distance the work piece 90 from the pivot pin 60 to the predetermined radius, is attached by several screws 94 to the attachment plate 62. The attachment plate 62, as described above, is placed around the pivot pin 60. Once the work piece 90 is retained by the surface 22, the securing knobs 32 are loosen to allow free rotation of the arms 30 and proper placement of the bridge 40 and router tool. After the router bit 82 is placed near the work piece 90, the securing knobs are tightened to provide structural rigidity for the woodworking apparatus 10.

During operation of the woodworking apparatus 10, the work piece 90 may be rotated, either by hand or by machine, about the pivot pin 60 along an arcuate path. To adjust the radius of the arcuate path or to cut another groove into the work piece 90 at a different radius, the clamp 64 may be detached from the guide 70, moved along the guide 70 toward a different position, and secured to the guide 70. At this new position, the radius of the arcuate path may be fine-tuned by turning the adjustment knob 72.

Each of the parts of the present invention is made of conventional materials and with conventional techniques in the machine tool arts.

The foregoing discussion discloses and describes a preferred embodiment of the present invention. One skilled in the art will readily recognize from such discussion, and from the accompanying drawings and claims, that changes and modifications can be made to the invention without departing from the true spirit and fair scope of the invention as defined in the following claims.

I claim:

1. A woodworking apparatus, comprising:

a base for retaining a work piece;

a bridge for mounting a tool;

two arms, both pivotally mounted to opposing sides of said base along a first pivot axis and both pivotally mounted to opposing sides of said bridge along a second pivot axis for selectively positioning the tool towards the top, side and bottom faces of the work piece;

a guide mounted to said base along a line generally perpendicular to said first pivot axis;

a pivot pin selectively securable along said guide and securable to the work piece for pivoting the work piece along an arcuate path with a predetermined radius measured from said pivot pin to the tool; and a radius adjuster mounted to said guide for selectively moving said guide relative to the tool and thereby adjusting the predetermined radius.

2. A woodworking apparatus, comprising:

a tool;

a bridge for mounting said tool;

a base for retaining a work piece; and two arms, both pivotally mounted to opposing sides of said base along a first pivot axis and both pivotally mounted to opposing sides of said bridge along a second pivot axis for selectively positioning said tool towards the top, side and bottom faces of the work piece.

3. The woodworking apparatus of claim 2, wherein said tool includes a spindle tool.

4. The woodworking apparatus of claim 3, wherein said spindle tool includes a router.

5. The woodworking apparatus of claim 3, wherein said spindle tool includes a shaper.

6. The woodworking apparatus of claim 3, wherein said spindle tool includes a disc attachment.

7. The woodworking apparatus of claim 2, wherein said tool includes a belt sander.

8. The woodworking apparatus of claim 2, wherein said multiple positions of said tool further includes at an angle towards the top and side faces of the work piece.

9. A woodworking apparatus, comprising:

a base for mounting a tool and retaining a work piece;

pivot means securable to the work piece for pivoting the work piece along an arcuate path with a predetermined radius measured from said pivot means to the tool; and adjustment means mounted to said base and securable to said pivot means for adjusting the predetermined radius, wherein said adjustment means includes a motor and a controller.

10. A woodworking apparatus, comprising:

a base for mounting a tool and retaining a work piece;

pivot means securable to the work piece for pivoting the work piece along an arcuate path with a predetermined radius measured from said pivot means to the tool;

adjustment means mounted to said base and securable to said pivot means for adjusting the predetermined radius; and a guide mounted to said base, wherein said pivot means is selectively securable along said guide, and wherein said adjustment means is mounted to said guide for moving said guide relative to the tool and thereby adjusting the predetermined radius.

11. The woodworking apparatus of claim 10, further comprising a clamp mounted to said pivot means and selectively securable along said guide.

12. The woodworking apparatus of claim 11, wherein said guide has an externally threaded portion, and wherein said adjustment means includes an adjustment knob mounted to said base having a internally threaded portion for receiving said externally threaded portion of said guide, such that said guide moves relative to the tool upon rotation of said adjustment knob.

13. The woodworking apparatus of claim 12, wherein said guide moves 0.0625 inches relative to the tool upon one full rotation of said adjustment knob.

14. A woodworking apparatus, comprising:

a base for mounting a tool and retaining a work piece;

a guide mounted to said base;

a pivot pin selectively securable along said guide and securable to the work piece for pivoting the work piece along an arcuate path with a predetermined radius measured from said pivot pin to the tool; and a radius adjuster coupled to said guide for selectively moving said guide relative to the tool and thereby adjusting the predetermined radius.

15. The woodworking apparatus of claim 14, further comprising a clamp mounted to said pivot pin and selectively securable along said guide.

16. The woodworking apparatus of claim 15, wherein said guide has an externally threaded portion, and wherein said radius adjuster includes an adjustment knob mounted to said base having a internally threaded portion for receiving said externally threaded portion of said guide, such that said guide moves relative to the tool upon rotation of said adjustment knob.

17. The woodworking apparatus of claim 16, wherein said guide moves 0.0625 inches relative to the tool upon one full rotation of said adjustment knob.

* * * * *